July 2, 1957  M. A. ORLINS  2,797,843
METHOD AND MEANS OF SEAMING PLASTIC INTERLINED CONTAINERS
Filed Jan. 25, 1954
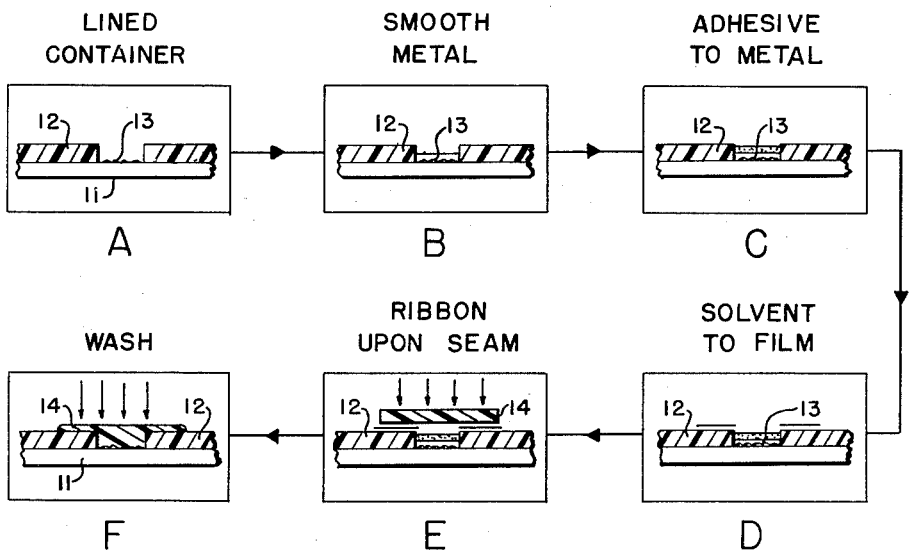
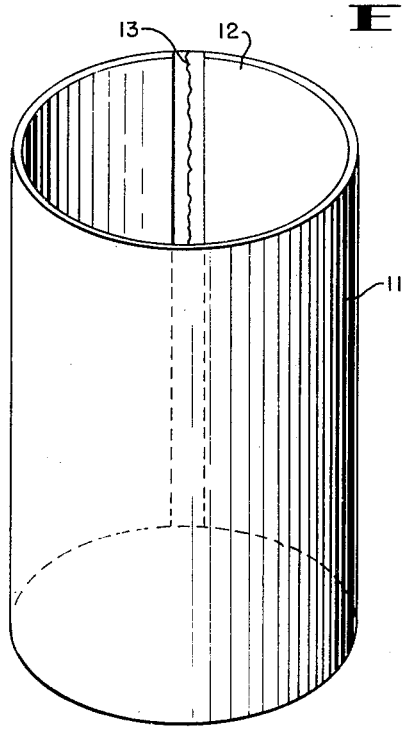
MARTIN A. ORLINS
*INVENTOR.*
BY

United States Patent Office 2,797,843
Patented July 2, 1957

2,797,843

METHOD AND MEANS OF SEAMING PLASTIC INTERLINED CONTAINERS

Martin A. Orlins, Millbrae, Calif., assignor to Rheem Manufacturing Company, Richmond, Calif., a corporation of California Application January 25, 1954, Serial No. 405,707

12 Claims. (Cl. 220—63)

The present invention relates to a method and means adapted for use in connection with the fabrication of metal containers formed with an interlining of plastic sheeting. The method and means is particularly applicable where as described in my copending application Serial No. 351,019, filed April 24, 1953, the main body of the liner is applied to the metal body plate prior to the side seaming operation, and in order to permit the side seam to be effected by welding or the like, the side edges of the lining are foreshortened so that the plastic material will not interfere with the welding operation. Consequently when the weld is completed, the seam portion will be minus any lining. The present invention concerns itself with a process and means of covering such seam portion with lining material so as to form with the latter a substantially continuous and uninterrupted interliner completely around the side wall of the container.

An object of the invention is to provide a process and means for joining the spaced edges of the liner which will provide an effective covering for the metal weld seam surface and an uninterrupted surface of the lining material for the entire inner side surface of the container.

It is another object of this invention to provide a means and method of unitarily connecting opposed and spaced edge portions of a plastic sheeting which forms a partial liner for a metal container by utilizing a strip of plastic sheeting which overlies and is secured to said edge portions and to the exposed metal therebetween, whereby the container interior will be provided with a continuous protective lining.

Another object of the invention is to provide a method of applying a strip of plastic material as above described in which means are provided for insuring attachment of intermediate portions of the strip to the exposed portion of the metal container, and independent means are utilized for creating a fusion bond between edge portions of the strip and the subjacent edge portions of the plastic sheeting.

A further object of this invention is to provide a method of the character described in which the fusing of the strip to the body of the plastic liner is controlled whereby none of the volatile gases generated during the fusing operation will be trapped, and whereby the fusing agent will be prevented from damaging the liner.

The invention possesses other objects and features of advantage, some of which with the foregoing, will be set forth in the following description of the preferred form of the invention which is augmented by the drawing accompanying and forming part of the specification. It is to be understood, however, that variations from the disclosure as set forth in the said drawing and description may be adopted within the scope of the invention as set forth in the claims.

Referring to said drawing:

Figure 1 is a diagrammatic representation of the steps of the process of the invention in the preferred embodiment.

Figure 2 is a projected view of a container with the ends removed and having an inner-liner whose edges are to be sealed in accordance with the steps of the process.

As hereinabove stated, the process of the present invention is particularly applicable in connection with a type of container fabrication wherein a sheet of plastic material has been applied to a metal plate prior to the rolling thereof, with the ends of the plastic spaced from the metal plate ends, whereby upon the rolling of the plate into cylindrical form, the ends of the plate will be positioned in abutting relationship for side seaming, while the ends of the plastic sheeting will be spaced from each other so as to prevent interference with the welding of the seam and avoid damaging of the adjacent portions of the liner. While this type of fabrication possesses definite advantages, it will be appreciated that the broad purpose is to provide a container offering chemical resistance to the container contents, and consequently some means must be provided to cover the exposed metal adjacent the seam portion and provide a smooth, and, in effect, a substantially seamless and leak-proof liner for the container. The term "plastic" as used herein, is meant to cover such materials as saran, mylar, vinyl or corresponding materials which possess the desired characteristics for a container lining.

A container constructed in the foregoing manner and ready for the utilization of the process of the present invention is illustrated in Figure 2 of the drawing. As will be seen, a plastic sheeting or liner 12 has already been secured to the inner surface of a metal container shell 11, with the ends of the liner positioned in opposed spaced relationship, leaving an exposed or bare metal portion 13 which contains a suitable welded or other side seam. The process now to be described includes the application of a plastic strip or ribbon 14 over such metal portion and over end portions of the liner, and the integral connecting of said strip to the liner 12.

The process may be considered to start with the container above described in the condition as diagrammatically shown in step A of Figure 1. The inner metal surface of portion 13 must be relatively free from sharp projections that might puncture or chafe plastic to be placed thereon, and thus in step B the side seam 13 is smoothed. Various smoothing operations are possible such as by abrading and the like, or as illustrated, by the application of a coating such as a heavy "saran" water-emulsion lacquer which upon drying covers the metal to provide the desired smooth surface.

The metal seam is to be covered with the plastic strip or ribbon 14 shown in later steps and formed of the same or similar material as the sheet 12 and joinder of this ribbon to the metal is to be accomplished by an adhesive. It is important to note that this adhesive is not to join the ribbon and liner 12, but only the ribbon and metal, as noted in detail hereinafter. Although the adhesive may be initially applied to either the ribbon or metal, it is preferable to apply it to the latter, as care must be exercised if it is applied to the ribbon to insure that it will not then contact the liner during subssequent bonding operations, and the handling of an adhesive coated ribbon likewise prevents additional handling difficulties. Thus, there is shown in step C the application of an adhesive to the metal between the liner edges and at the same time the heating of this metal to make the adhesive tacky and more rapidly drying. The adhesive employed should have good bond strength, an affinity for both the prepared metal surface and plastic ribbon, good flexibility and stability, a rapid attainment of bond strength, and preferably be resistant to corrosion. Various adhesives fulfil these requirements in differing degrees and it has been found that good results are obtained with synthetic rubber dispersed in organic solvents or synthetic rubber latexes, or synthetic resins, such as acrylics, vinyls and copolymers. Many of these synthetic resins may be used either dispersed in organic solvents or in water. If for any reasons, the adhesive is applied to the ribbon directly rather than to the metal the coated ribbon prior to its application to the container may be passed through a small oven or the like to improve the bond. This heating should drive off volatile fractions of the adhesive which otherwise might be later released to the detriment of the bond and it is preferable in this connection that the metal be heated to a temperature in the range of 180 to 200 degrees Fahrenheit when the ribbon is being applied. It will be understood that the width of strip 14 is substantially greater than the width of the exposed metal portion 13, and consequently, only the inner area of the strip will either be coated with or brought into contact with the adhesive.

While the inner portion of the strip is secured to the metal by an adhesive, joinder of the outer edges of ribbon 14 to the liner 12 is accomplished by the welding together of these two similar pieces of material without requiring fusion by heating. There is employed for this welding a solvent which dissolves the portions of the two materials directly in contact so that upon solidification, no line of separation remains and but a single piece of material results virtually providing a seamless lining for the container. This operation is to be clearly distinguished from an adhesive joinder where a bonding agent is employed, for in this latter case the adhesive at the outer edge of the lapped plastic portions is open to attack by material within the container and the vulnerability of the liner is thus limited to that of the adhesive. In the present process desirably no adhesive is present between the overlapped portions of the strip and the liner, so that only the properties of the liner and ribbon need be considered in determining the imperviousness of the liner. Numerous solvents such as the classes of ketones and esters are suitable for the purpose herein contemplated and for example, dioxan, tetrahydrofuran, cyclohexanone, cyclopentanone, isophorone or O-dichlorobenzene may be used alone or in combination, however it has been found preferable to use solvents which are miscible with water in various proportions. Step D thus comprises the application of solvent to the liner 12 extending from the opposite edges thereof a sufficient distance to cover all of the liner surface that will be contacted by the ribbon. It is contemplated that the metal container shall during the application of the ribbon 14 thereto be maintained hot, as at a temperature of 180 to 200 degrees Fahrenheit. The drum may be at this temperature following the prior application of the liner 12 thereto, or if not, the container is heated prior to the application of the adhesive to the metal, as at step C.

Immediately following the application of the solvent to the liner, step D, the ribbon 14 is introduced into the container as shown in step E. Preferably the ribbon 14 is rolled over the seam and the edge portions of the liner with a roller applying pressure to the ribbon during application, and the under surface of the ribbon contacts the smooth weld strip having the adhesive thereon. The combination of pressure and heat from the container, rapidly sets up the adhesive so that the ribbon is permanently bonded to the weld strip, and likewise, the softened ribbon and liner edges are welded together by the pressure of application and aided by the heat present. No great pressure need be applied to the ribbon to weld the same to the liner as the solvent itself effectively accomplishes this bonding.

One of the serious difficulties that may be encountered in adhesive or solvent bonding is the formation of gas or vapor between the bonded or fused surfaces following joinder thereof with resultant bubbles that impair the bond strength. Also, solvents which dissolve the material to be bonded may dangerously weaken the liner material and/or ribbon if allowed to operate uncontrolled. To eliminate these difficulties, the rapid application of heat to drive off the volatile gases from the adhesive and solvent is used, and any excess solvent is rapidly removed from contact with the liner and strip by a washing process. Heat may be applied such as by infra red lamps to the exterior of the container, or by a blast of hot fluid, such as air or water. In the present embodiment, it has been found more desirable to apply a stream of water at a temperature of between 200°–210° F. to the liner immediately following the fusion of the strip thereto. The heated water serves a dual function in first, supplying the heat for volatilization, and second, dilutes and extracts all traces of the free solvent from the liner. Obviously, if the solvent was of the type that was readily dissolved by cold water rather than hot water, a cold water stream or bath would be utilized.

It is contemplated that in the accomplishment of the above described process that certain of the steps thereof may be combined and also that certain of the details thereof may be varied. Thus, in certain applications it may be desirable to apply the solvent, adhesive or both to the ribbon 14 rather than to the metal surface or to the liner. In practice, the ribbon may be advantageously provided in roll form and applied by unrolling the same along the seam and cutting off the ribbon at the end of the container as by a hot wire or other suitable means. Also it is noted that the application of heat may be done in various ways as by directly or indirectly heating the container, and it has been found that full development of the desired adhesive properties results from bonding to hot steel as described.

What is claimed is:

1. In the fabrication of a cylindrical metal container having an axially extending side seam and a plastic interliner covering and secured to the inner peripheral surface of said container except at said seam; a method of forming an uninterrupted protective lining for said container comprising: placing a strip of plastic over said seam and over the exposed inner surface of adjacent edge portions of said interliner, bonding the confronting surfaces of said seam and said strip with an adhesive, and fusing the confronting surfaces of said strip and said interliner edge portions together.

2. In the fabrication of a cylindrical metal container having an axially extending side seam and a plastic interliner covering and secured to the inner peripheral surface of said container at all portions except at said seam; a method of forming an uninterrupted protective lining for said container comprising: placing a strip of plastic over said seam and over the exposed inner surface of adjacent edge portions of said interliner, bonding the confronting surfaces of said seam and said strip with an adhesive, and fusing the confronting surfaces of said strip and said interliner edge portions together by applying a plastic solvent to at least one of said surfaces, and applying pressure to said strip against said seam and said interliner portions.

3. In the art of fabricating metal containers having a side seam and an interliner of plastic sheeting covering the side walls of the container except at said seam, a method of applying a plastic sheeting strip over said seam and the exposed inner surface of adjacent edges of said interliner, comprising the steps of applying adhesive to the metal at the seam, applying a plastic solvent to the portions of the liner adjacent said seam, and applying said strip over said seam and said liner portions and applying pressure thereto.

4. In the art of fabricating metal containers having a side seam and an interliner of plastic sheeting covering and secured to the side walls of the container except at said seam, a method of applying a plastic sheeting strip over said seam and over the exposed inner surface of adjacent edges of said interliner, comprising the steps of applying adhesive to the metal at the seam, applying a plastic solvent to the portions of the liner adjacent said seam, applying said strip over said seam and said liner portions and applying pressure thereto, heating the container in the zone of the strip, and applying water to the exposed surface of the strip and exposed adjacent surfaces of said interliner.

5. In the manufacture of metal containers having a side seam and a plastic liner extending around and secured to the inner surface of said container with the edge portions thereof disposed in spaced relation at said seam; the process of providing a continuous plastic lining for said container which comprises the application of a plastic strip over said seam and over the exposed inner edge portions of said liner, placing an adhesive between the central portion of said strip and said seam for securing the same together, placing a plastic solvent between said edge portions of said strip and the edge portions of said liner for fusing the same together, and washing the interior of said container with water for removing excess solvent therefrom.

6. A process as set forth in claim 5 further characterized by said washing being performed substantially immediately following the application of said strip and with the water having a temperature of approximately 200 degrees Fahrenheit.

7. In the manufacture of metal containers having a side-seam and a plastic liner extending around the inner surface of said container with the edge portions disposed in spaced relation at said seam, the process of providing a continuous plastic lining for said container which comprises applying a plastic-to-metal adhesive to said seam, applying a plastic solvent to said edge portions of the liner, applying to said seam and to the exposed inner surface of said edge portions a strip of plastic and pressing the latter thereon whereby a center portion of said strip will be adhesively bonded to said seam and edge portions of said strip will be fused to the edge portions of said liner by the dissolving of the confronting portions of strip and liner, heating said container to drive off volatile parts of said solvent, and applying water to the exposed surface of said strip and exposed adjacent surfaces of said liner for removing excess solvent therefrom.

8. A method as set forth in claim 1 in which the adhesive is applied to a center portion of the strip prior to the latter's contact with said seam.

9. A method as set forth in claim 2 in which said solvent is applied to outer edge portions of said strip prior to the contact of said strip with said edge portions of said liner.

10. In the manufacture of metal containers having a side seam and a plastic liner extending around and secured to the inner surface of said container with the edge portions thereof disposed in spaced relation at said seam; the process of providing a continuous plastic lining for said container which comprises heating the metal container at said side seam, applying a strip of plastic material over said seam and over the exposed inner surface of edge portions of said liner, providing a metal-to-plastic adhesive between a central portion of said strip and said seam and a plastic solvent between the edge portions of said strip and said liner edge portions, pressing said strip against said seam and liner whereby said strip will adhere to said seam and will be fused to said liner, and then washing the exposed surface of said strip and exposed adjacent surfaces of said liner with hot water.

11. A process as set forth in claim 10 in which said seam is heated to a temperature in the approximate range of 180 to 200 degrees Fahrenheit and maintained at such temperature throughout said process.

12. A container comprising: a cylindrical metal body having an axially extending side seam, a sheet of plastic secured to said body with the ends of the sheet disposed in opposed spaced relation on either side of said seam, a strip of plastic extending axially of said body and overlying said seam and adjacent end portions of said sheet, means providing an adhesive attachment of a central portion of said strip to said metal seam, and edge portions of said strip being fused to said end portions of said sheet whereby said sheet and said strip will form a continuous plastic interliner for said container.

References Cited in the file of this patent
UNITED STATES PATENTS

| | | |
|---|---|---|
| 852,761 | Bodine | May 7, 1907 |
| 1,899,067 | Trumbull | Feb. 28, 1933 |
| 2,209,403 | Kittner | July 30, 1940 |
| 2,321,777 | Schelhammer et al. | June 15, 1943 |
| 2,343,106 | Carney | Feb. 29, 1944 |
| 2,495,817 | Olsen et al. | Jan. 31, 1950 |
| 2,629,953 | Von Stackelberg et al. | Mar. 31, 1953 |